UNITED STATES PATENT OFFICE.

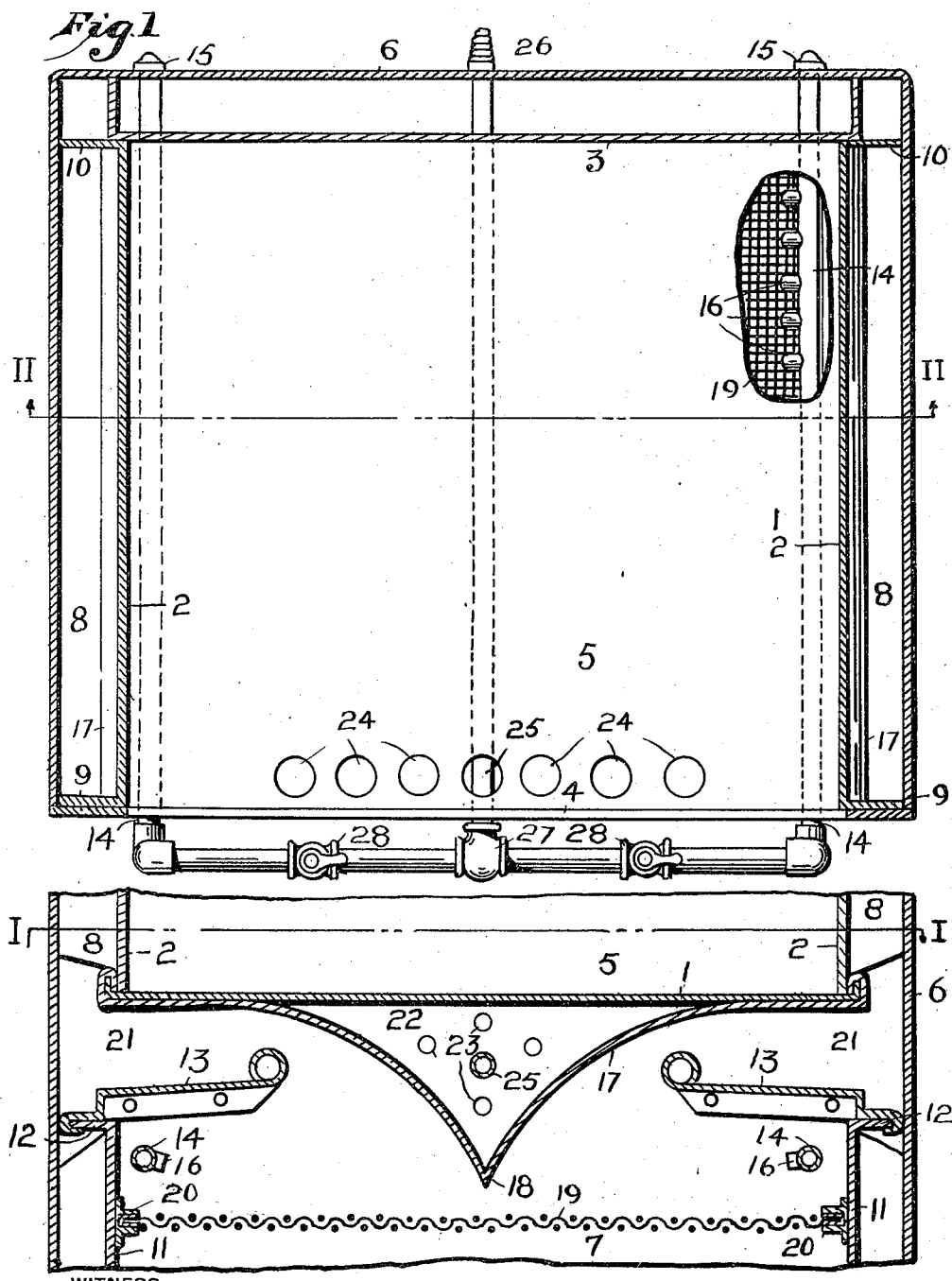

GEORGE F. REZNOR, OF MERCER, PENNSYLVANIA.

GAS-OVEN.

1,235,602. Specification of Letters Patent. Patented Aug. 7, 1917.

Application filed July 28, 1916. Serial No. 111,783.

*To all whom it may concern:*

Be it known that I, GEORGE F. REZNOR, a citizen of the United States, residing at Mercer, in the county of Mercer and State of Pennsylvania, have invented new and useful Improvements in Gas-Ovens, of which the following is a specification.

My invention relates to gas ovens.

One of the objects of this invention is to provide an oven which may be heated economically and efficiently by burners without mixers, for example, by burners comprising lava tips arranged in the gas supply pipe or pipes, so that the air meets the gas only as it issues from the tips. Heretofore, it has been thought to be essential that gas ovens should be heated by burners which consumed gas previously mixed with air, but I have demonstrated by the use of the oven shown on the drawing herein that this belief has no basis in fact. It is another object of this invention to preheat the gas whereby a higher heat is obtained and a saving of gas is effected. It is also my object to have between the rows of burners a double reflector which provides an air space between the oven bottom and the burners, in which the gas may be preheated. I also make use of a screen in the broiling chamber to prevent the currents of air or of vapors from broiling articles from interfering with the steady burning of the heating gas. The screen acts like a brake on the air and vapors and causes them to be diffused in the combustion chamber above the screen and to pass through this chamber with uniform velocity and without causing the long-tongued flames from the burners to contact with adjacent parts and coat them with carbon.

Referring to the accompanying drawing, Figure 1 is a horizontal section through the baking oven containing my invention, a portion being broken away to show a part of one of the burners below the oven floor. Fig. 1 is taken on the line I—I of Fig. 2. Fig. 2 is a section on the line II—II of Fig. 1, the upper portion of the baking oven and the lower portion of the broiling chamber being broken off.

On the drawing, 1 designates the floor, 2 the side walls, 3 the rear wall, and 4 the front wall of the baking chamber 5. The chamber 5 is arranged in the upper portion of the casing 6, and the broiling chamber 7 is arranged in the lower portion thereof. The sides of the casing are spaced from the oven sides 2 so as to form the flues 8 extending upwardly at the sides of the chamber 5. These flues extend along the entire sides 2 of the chamber 5 and are closed at their front and rear by the walls 9 and 10.

The chamber 7 has its sides 11 separating it from the casing 6, the upper ends of the sides terminating at 12, a short distance below the bottom 1 of the chamber 5. From each of the ends 12 of the sides 11, I provide a baffle 13 extending toward the center of the casing, these baffles being inclined upwardly slightly from the sides 11.

Beneath each baffle 13 and near the adjacent side 11, I arrange a gas pipe 14 parallel with the sides 11 and extending from the front wall 4 through the rear wall 3 and the rear wall of the casing 6 where it is provided with a cap 15. Each pipe 14 is provided in the chamber 5 with a row of burners or tips 16 extending toward the center of the casing and inclined slightly downward.

17 is a deflector composed of sheet metal having its side edges secured to the side edges of the floor 1 and its intermediate portion curved inwardly and downwardly to a ridge 18, toward or slightly below which the burners 16 point. The flames from the burners are long and a large portion of the heat therefrom is reflected downwardly into the broiling chamber 7 through the horizontal screen 19, which may be made of wire secured in a frame readily removable from the guides 20 on the sides 11. The screen is placed rather close to the burners and acts as a brake and diffuser to stop and break up or scatter the currents of air and vapors which in the absence of the screen would interfere with the quiet uniform action of the burners. Without the screen the air would rush up in currents which sweep the long flames in every direction causing them to touch adjacent parts and deposit carbon thereon. As the flames from the burners are yellowish, it is particularly necessary to provide for the quiet undisturbed operation of the burners in order to prevent rapid deposition of carbon and serious disturbance of the combustion of the gas. The baffles 13 terminate short of the reflector 17, so that the products of combustion in the chamber 7 may pass up in both directions from the ridge 18 into the spaces 21 above the baffles, whence they go into the flues 8. The vapors and gases from articles broiled in the chamber 7 interfere materially less with the burners when the screen 19 is used as they are broken up and diffused, and meet the burning gas quietly and uniformly.

The chamber 22 between the floor 1 and the reflector 17 is somewhat triangular in cross-section and is supplied with air through the rear openings 23, the air passing toward the front and being highly heated escapes into the chamber 5 through the openings 24. The inlet gas pipe 25 extends from the rear side of the casing, where it is supplied with a suitable connector 26, through the chamber 22 and the front wall 4. The front end of the pipe 25 is connected to the T 27, from which the branch pipes, each provided with a valve 28, extend to the pipes 14. The chamber 22 serves as a preheater for the gas as it passes through the pipe 25 and also as a spacer to prevent the bottom of the chamber 5 from becoming too hot.

I do not desire to be restricted to the precise combinations and details shown and described as they may be variously modified without departing from the spirit of this invention.

I claim—

1. An oven chamber having heating flues at each side, gas burners beneath the bottom of the chamber and adjacent to the sides thereof which have flues, a deflector parallel with the burners and extending upwardly from between the burners toward the said flues and downwardly so as to prevent the burning gases due to one burner from mingling with those due to the other burner, and baffles above the burners so arranged as to direct the products of combustion from each burner upwardly between the baffle and the deflector, the gas from each burner first meeting air after issuing therefrom and being directed toward the deflector.

2. A casing, baffles secured to opposite sides thereof and extending toward each other, a burner arranged below each baffle and in the angle between the baffle and the adjacent side of the casing, an oven chamber in the casing above the baffles and spaced from the said sides of the casing to form heating flues for the said chamber, and a deflector parallel with each burner, and extending downwardly between the burners so as to prevent the commingling of the burning gases due to the two burners and upwardly and outwardly between the baffles but spaced therefrom, whereby the products of combustion escape between the deflector and the baffles and are led to the said flues, the gas from each burner being directed toward the deflector.

Signed at Mercer, Pa., this 22nd day of July, A. D. 1916.

GEORGE F. REZNOR.

Copies of this patent may be obtained for five cents each, by addressing the "Commissioner of Patents, Washington, D. C."